(12) United States Patent
Shiv

(10) Patent No.: US 9,292,789 B2
(45) Date of Patent: Mar. 22, 2016

(54) CONTINUOUS-WEIGHT NEURAL NETWORKS

(71) Applicant: CALIFORNIA INSTITUTE OF TECHNOLOGY, Pasadena, CA (US)

(72) Inventor: Vighnesh Leonardo Shiv, Portland, OR (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 355 days.

(21) Appl. No.: 13/781,508

(22) Filed: Feb. 28, 2013

(65) Prior Publication Data

US 2013/0232097 A1 Sep. 5, 2013

Related U.S. Application Data

(60) Provisional application No. 61/606,162, filed on Mar. 2, 2012.

(51) Int. Cl.
*G06N 3/04* (2006.01)
*G06N 3/08* (2006.01)

(52) U.S. Cl.
CPC ... *G06N 3/08* (2013.01); *G06N 3/04* (2013.01)

(58) Field of Classification Search
CPC ..... G06N 3/04; G06N 3/454; G06F 17/30705
See application file for complete search history.

(56) References Cited

U.S. PATENT DOCUMENTS 5,086,479 A 2/1992 Takenaga et al.
5,095,443 A * 3/1992 Watanabe ............... 706/10
2005/0216200 A1 9/2005 Urquidi-MacDonald et al.
2005/0267739 A1 12/2005 Kontio et al.
2009/0276385 A1 11/2009 Hill

FOREIGN PATENT DOCUMENTS

JP 5342190 A 12/1993
KR 100228316 B * 11/1999
WO 2012/113635 A1 8/2012

OTHER PUBLICATIONS

B. Kostek, "Soft Computing-Based Recognition of Musical Sounds", Chapt. 11 in Rough Sets in Knowledge Discovery 2, pp. 193-213, 1998.*
R. Lippmann, "An Introduction to Computing with Neural Nets", IEEE ASSP Magazine, Apr. 1987, pp. 4-22.*
1-Le Roux, N. et al., *Continuous Neural Network*, in *Proceedings of 11th International Conference on Artificial Intelligence and Statistics*, 2007, 8 pages.
2-Kwan, H.K., *Multiplierless Designs for Artificial Neural Networks*, Neural Networks and Systolic Array Design, 2002, pp. 301-325.

* cited by examiner

*Primary Examiner* — Kakali Chaki
*Assistant Examiner* — Vincent Gonzales
(74) *Attorney, Agent, or Firm* — Steinfl & Bruno LLP

(57) ABSTRACT

A computer-based multi-layer artificial network named Continuous-weight neural network (CWNN) configured to receive an input feature set wherein the input feature set comprises a variable number of features is disclosed. A method for classifying input sets based on a trained CWNN is also disclosed. Various implementation examples are also provided.

11 Claims, 12 Drawing Sheets

A CWNN TRAINING ALGORITHM

CONTINUOUS-WEIGHT NEURAL NETWORKS

CROSS REFERENCE TO RELATED APPLICATIONS

The present application claims priority to U.S. provisional application 61/606,162 for "Continuous-Weight Neural Networks" filed on Mar. 2, 2012, which is herein incorporated by reference in its entirety.

FIELD

The present disclosure relates to methods and algorithms related to the field of machine learning, a subfield of artificial intelligence. In particular, the present disclosure presents Continuous-Weight Neural Networks, a novel machine learning mechanism that can analyze a domain of feature representations on which previous machine learning mechanisms could not operate.

BACKGROUND

Machine learning concerns the ability of a computer to learn from training data or previous experiences to improve future performance. It forms an important subfield of artificial intelligence, and learning algorithms often form core components in artificial intelligence applications.

SUMMARY

According to a first aspect of the present disclosure, a computer-based multi-layer artificial network named Continuous-weight neural network (CWNN) is presented, the CWNN being configured to receive an input feature set wherein the input feature set comprises a variable number of features.

According to a second aspect of the present disclosure, a musical instrument classifier training computer processor is presented, the musical instrument classifier training computer processor comprising: a database containing a plurality of musical files in correspondence to a plurality of musical instruments; a modeling computer processor configured to apply a sinusoidal modeling algorithm to an input musical file; and a neural network-based training computer processor configured to generate a neural network comprised of a main network and a control network and apply a gradient descent algorithm to the main network and the control network based on provided training samples of variable lengths, the neural network being a continuous-weight multi-layer neural network (CWNN) comprising a plurality of nodes, the CWNN configured to receive an input feature set, the input feature set comprising a variable number of features, wherein the training samples of variable lengths are generated by the modeling computer processor based on each of the plurality of musical files of the database and wherein a trained CWNN is obtained upon gradient descent application of all the training samples upon the main network and control network.

According to a third aspect of the disclosure, a musical instrument classifier processor is presented, the musical instrument classifier processor comprising: a modeling computer processor configured to apply a sinusoidal modeling algorithm to an input musical sample; a continuous-weight multi-layer neural network (CWNN) comprising a plurality of nodes, the CWNN configured to receive an input feature set, the input feature set comprising a variable number of features; wherein the input musical sample to the modeling computer processor is converted to an input impulse representation (IR) by the modeling computer processor and fed to the CWNN for detection of a class of the input musical sample.

According to a fourth aspect of the disclosure, a computer-based method for implementing a neural-network based classifier is presented, the neural network being a continuous-weight multi-layer artificial neural network (CWNN), comprising a plurality of nodes, the CWNN configured to receive an input feature set, the input feature set comprising a variable number of features, the method comprising: providing, through a computer, a CWNN comprising a main network and a control network, wherein the main network comprises a hidden layer comprising $M_I$ hidden nodes and an output layer comprising $M_O$ output nodes, and wherein the control network comprises an input layer comprising $C_I$ input nodes, a hidden layer comprising $C_H$ hidden nodes and an output layer comprising $M_I$ output nodes; providing, through the computer, an input impulse representation (IR) comprising N features, wherein N is a variable and wherein each of the N features comprises a corresponding input value of dimension one and a corresponding input point of dimension $C_I$; constructing, through the computer, a prime network comprised of N input nodes, $M_I$ hidden nodes and $M_O$ output nodes, the prime network being a two-layer perceptron; constructing, through the computer, a plurality of weighted connections between the hidden nodes and the output nodes of the prime network identical to a plurality of weighted connections between the hidden nodes and the output nodes of the main network; selecting, through the computer, a feature of the N features; based on the selecting, associating, through the computer, an input node of the N input nodes of the prime network to the feature and inputting a corresponding input value to the associated input node; repeating, through the computer, the selecting, associating and inputting for all N features of the input IR; based on the repeating, obtaining, through the computer, a one to one mapping of the N features into the N input nodes; for each of the N input nodes of the prime network, feeding, through the computer, a corresponding input point of the associated feature to the control network and constructing, through the computer, $M_I$ weighted connections from the input node to the $M_I$ hidden nodes of the prime network using $M_I$ output values of the control network as values for the $M_I$ weights; propagating, through the computer, the N input values of the N input nodes of the input layer of the prime network through the hidden and output layers of the prime network using the constructed weighted connections; obtaining, through the computer, an output of the prime network in correspondence of the N input values at the output layer of the prime network, and classifying, through the computer, the input IR to the CWNN based on the obtaining of the output.

According to a fifth aspect of the disclosure, a computer-based method for training a neural network, the neural network being a continuous-weight multi-layer artificial neural network (CWNN) comprising a plurality of nodes, the CWNN configured to receive an input feature set, the input feature set comprising a variable number of features, the method comprising: providing, through a computer, a set of training impulse representations (IR); classifying, through the computer, each IR of the set based on the method of claim 19; based on the classifying, computing, through the computer, a mean-squared error gradient on the prime network using backpropagation; based on the computing, updating, through the computer, for each hidden node, output node or weighted connection between a hidden node and an output node of the prime network a corresponding variable in the direction of the computed gradient; for each weighted connection of an input node of the prime network to a hidden node of the prime network, defining, through the computer, a corresponding error gradient to be an error gradient component of an output of the control network; based on the defining, computing, through the computer, a mean-squared error gradient on the control network using backpropagation, and updating for each hidden node, weighted connection between an output node and a hidden node or weighted connection between a hidden node and an input node of the control network a corresponding variable in the direction of the computed gradient.

According to a sixth aspect of the disclosure, a computer-based method for implementing a neural-network based classifier, the neural network being a continuous-weight multi-layer artificial neural network (CWNN) comprising a plurality of nodes, the CWNN configured to receive an input feature set, the input feature set comprising a variable number of features, the method comprising: (1) providing, through a computer, an input feature set f to the CWNN comprising of an impulse representation (IR) of N impulses, N being a variable integer, wherein for each i, i∈[1,N], an $i^{th}$ impulse of the N impulses is defined by a real number $a_i$ and a real vector $d_i$ of dimension $C_f$; (2) configuring, through the computer, a main network and a control network of the CWNN; (3) constructing, through the computer, $M_I$ input nodes, $M_O$ output nodes, and ($M_I \times M_O$) weighted connections between the $M_I$ input nodes and the $M_O$ output nodes of the main network; (4) constructing, through the computer, $C_I$ input nodes, $C_H$ hidden nodes, $C_O = M_I$ output nodes, ($C_I \times C_H$) weighted connections between the $C_I$ input nodes and the $C_H$ hidden nodes, and ($C_H \times M_I$) weighted connections between the $C_H$ input nodes and the $M_I$ output nodes of the control network; (5) constructing, through the computer, a prime network comprising of N input nodes, $M_I$ hidden nodes, $M_O$ output nodes, ($N \times M_I$) weighted connections between the N input nodes and the $M_I$ hidden nodes, and ($M_I \times M_O$) weighted connections between the $M_I$ hidden nodes and the $M_O$ output nodes; (6) setting, through the computer, the ($M_I \times M_O$) weighted connections between the $M_I$ hidden nodes and $M_O$ output nodes of the prime network to be identical to the weighted connections between the $M_I$ input nodes and $M_O$ output nodes of the main network; (7) Implementing, through the computer, step (8); (8) let i=1 and i∈[1,N]; a) let the real number $a_i$ be an input value for the $i^{th}$ input node of the prime network; b) let the real vector $d_i$ of dimension $C_I$ be an input value to the $C_I$ input nodes of the control network; c) propagate the real vector $d_i$ through the control network; d) let $w_i = (w_{i1}, w_{i2}, \ldots, w_{ij}, \ldots w_{iMI})$, a real vector of dimension $M_I$, be an output of the control network; e) let the values of the $M_I$ weights of the $M_I$ connections between the $i^{th}$ input node of the prime network and the $M_I$ hidden nodes of the prime network be the $M_I$ values $w_{ij}$ of the real vector $w_i$, with j∈[1,MI]; f) let i=i+1; go to step a) if i<N+1, else go to next step; (9) propagating, through the computer, the N input values of the N input nodes of the prime network through the prime network; (10) obtaining, through the computer, an output o of the prime network, wherein $o=(o_1, o_2, \ldots, o_j, \ldots o_{MO})$, is a real vector of dimension $M_O$; (11) obtaining, through the computer, a class c of the input feature f provided by the CWNN, wherein c=o.

Further aspects of the disclosure are shown in the specification, drawings and claims of the present application.

DETAILED DESCRIPTION

Throughout this disclosure, the term "machine learning" refers to a branch of artificial intelligence, and is about the construction and study of systems that can learn from known data. After learning, such systems can be used to classify new data presented to them.

Figure 1:
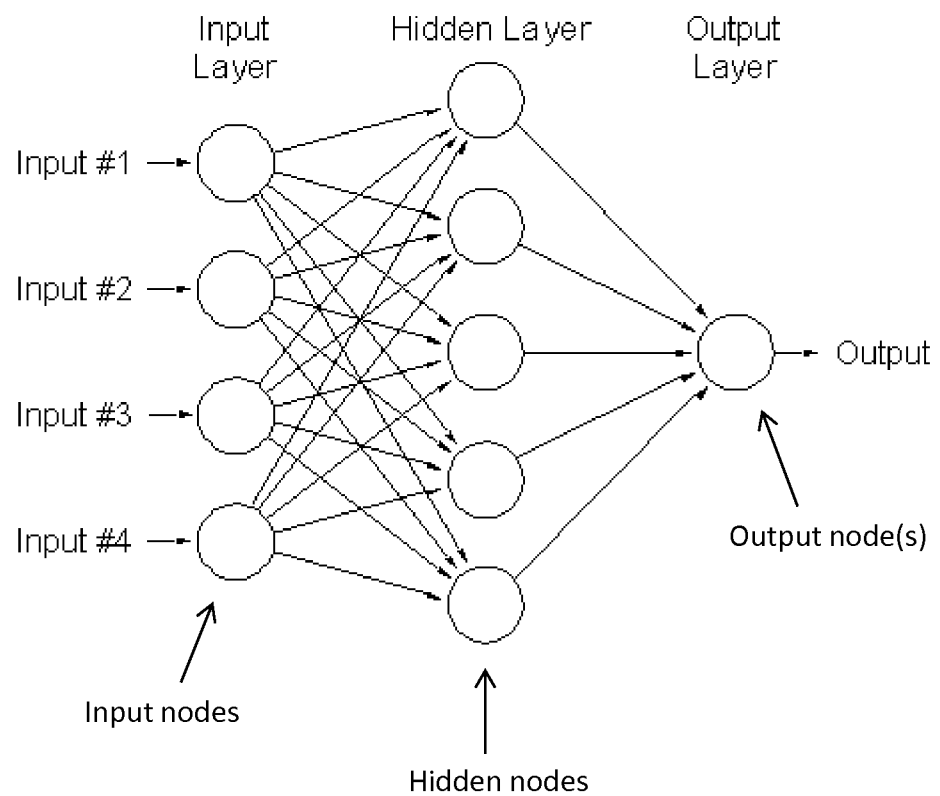
FIG. 1 shows a diagram of a two-layer perceptron (e.g. a feedforward artificial neural network) comprising an input layer, a hidden layer and an output layer.
Figure 2:
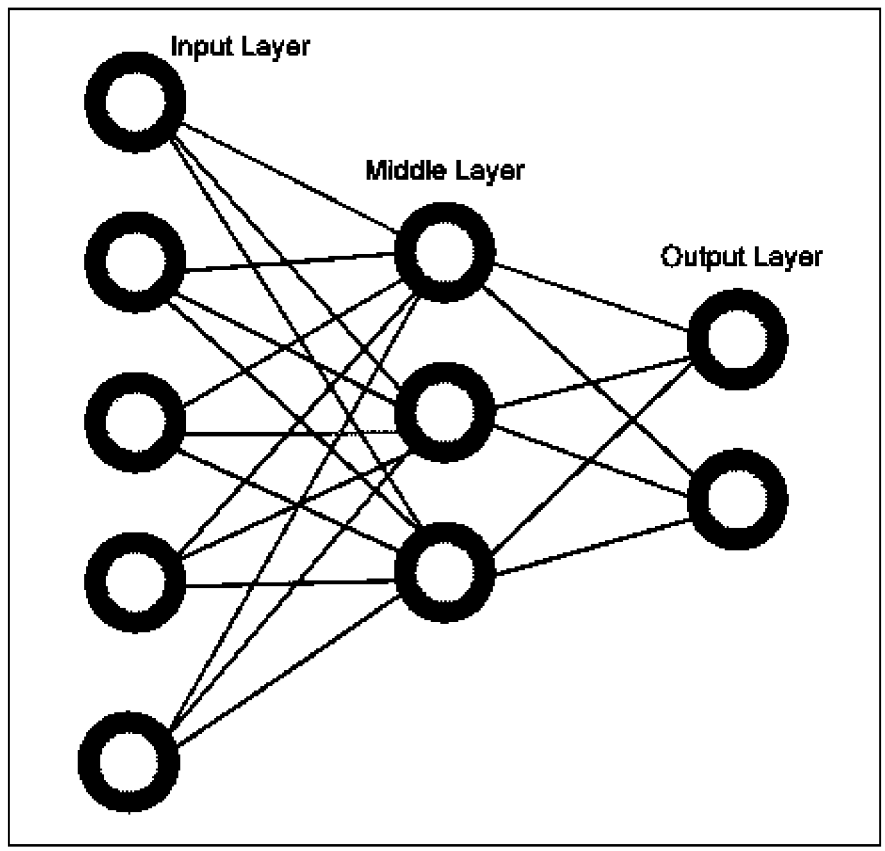
FIG. 2 shows a diagram of a two-layer perceptron comprising same layers as one in FIG. 1 but with different number of nodes per each layer.

Throughout this disclosure, the term "multilayer perceptron" (MLP) refers to a feedforward artificial neural network model that maps sets of input data onto a set of appropriate output. An MLP consists of multiple layers of nodes, in a directed graph, with each layer fully connected to the next one. MLP utilizes a learning technique called backpropagation for training the network. FIGS. 1 and 2 are example diagrams of MLPs. MLPs usually have fixed number of input and output nodes corresponding to an input and output layer respectively.

Throughout this disclosure, the term "classifier" refers to one of the most common tasks associated to a (multi-layer) perceptron, which is on one of categorizing (referred to as "classifying") input data into a set of known categories. For example, a simple perceptron may perform pattern classification of provided input patterns into two or more categories. For the task of classifying, a perceptron is "trained" using "training samples", which are input data of known categories, and using rules, such as the "gradient descent algorithm".

Throughout this disclosure, a "feature set" refers to a data type for which an associated schema and symbology is defined. The schema may be defined as a function, a series or a single value. For example the set of impulse representation functions defined by the symbol "IR" and the schema: $\{f: f \in (\mathbb{R}^{C_I} \to \mathbb{R}); f(x) = \sum_{i=1}^{N} a_i \delta(x-d_i)/\delta(0) f$ or $N \in \mathbb{N}, a_i \in \mathbb{R}, d_i \in \mathbb{R}^{C_I}\}$, is a feature set.

Throughout this disclosure, an "input feature" referres to an element of a feature set which may be used as an input data to a neural network. In the case of an IR, an input feature is a function f as described by the assocaited schema. In practice, knowing the schema, the input feature may be reduced to some basic elements and may simply be called "input data". In the case of an input feature from an IR, the input feature can be reduced to the (input data) elements $a_i$ and $d_i$ where $i \in [1,N]$.

Throughout this disclosure, a "computer", or "computer system" or "computer processor", refers to an electronic device for storing and processing data which may include some user interface.

Often, in digital signal processing and applied mathematics, an input data signal can be represented as a sparse combination of atom functions selected from an overdetermined dictionary of infinite size.

For instance, while a discrete Fourier transform will convert an input signal into a weighted sum of sinusoids of predetermined frequencies, it may be possible to represent some types of signals, such as audio signals and other quasi-periodic phenomena, with a sparser set of sinusoids by allowing sinusoidal frequencies to be selected from a continuum. There are similar analogs with wavelet decomposition and computer vision tasks.

These sparse feature representations have important advantages; empirically, sparsity leads to improved analysis via machine learning algorithms, as low dimensionality is key to robust learning and good generalization, due to the curse of dimensionality.

Such dictionary-based representations (e.g. sparse combination of atom functions) are referred to as impulse representations (IRs), as mathematically they can be considered as a finite sum of scaled and shifted impulses on a continuous space. Each point on the continuous space corresponds to an atom function in the dictionary, and the height of the impulse at that point represents the weight of that atom in the weighted sum.

However, as discussed further in the following sections, IRs are unsuitable for processing via current learning mechanisms; they represent a variable number of input features, one for each impulse, where most learning algorithms operate on fixed-length feature vectors.

Since IRs allow for sparser feature set in a variety of scenarios, and thus improved learning quality in many of these scenarios as feature sparsity is strongly correlated with learning robustness, a machine learning mechanism that could operate on the IR domain would be extremely useful.

Based on the above recognitions and observations of the inventor, with reference to the attached drawings and according to some embodiments of the present disclosure, a novel machine learning mechanism, continuous-weight neural networks (CWNN), that operates on the IR domain is disclosed.

The utility of machine learning stems from its ability to derive implicit models for binary classifiers or real-valued functions of data. Machine learning is thus a powerful tool in circumstances where functions are difficult to explicitly model, such as in highly uncertain circumstances and in scenarios that would otherwise require intensive neural simulations to reverse-engineer perceptual tasks performed by the brain, for instance in computer vision and speech processing.

Machine learning mechanisms rarely act directly on raw input data. Rather, higher-level features are usually extracted from the raw data, and the learning mechanism acts on this feature representation. Modern machine learning encompasses a number of machine learning mechanisms; however, these mechanisms are restricted as to what feature set domains they can operate on.

The vast majority of machine learning algorithms, including commonly employed classifiers such as multilayer perceptrons, which are feedforward artificial neural networks, and random forest classifiers, operate on the set $\mathbb{R}^n$ (vector of fixed dimension n with components belonging to the set $\mathbb{R}$ of real numbers). As such, these mechanisms can only operate on a feature vector extracted from the input data of predetermined and fixed length. More generally, no current machine learning mechanisms can operate on IRs directly without information loss.

FIG. 1 is a diagram of a standard (two-layer) multilayer perceptron, which consists of a layer of output nodes (single output in this case), a layer of hidden nodes (five nodes), a layer of input nodes (four nodes), a layer of weighted connections (shown as arrows) from the hidden nodes to the output node(s), and a layer of weighted connections from the input nodes to the hidden nodes. FIG. 2 is a diagram of a standard (two-layer) multilayer perceptron similar to one depicted by FIG. 1, which includes the same layer structure, an input layer, a hidden layer and an output layer, but with differing number of nodes per layer (five input nodes, three hidden nodes, and two output nodes).

Multilayer perceptrons accept input representations consisting of a fixed number of input features (e.g. four inputs for multilayer perceptron of FIG. 1, and five inputs for one in FIG. 2), each of which is a single number; the number of input features is specified by the multilayer perceptron, and is fixed.

According to various embodiments of this disclosure, a continuous-weight neural network is a multilayer perceptron equipped with several key modifications.

According to a first embodiment of this disclosure, a continuous-weight neural network accepts input representations containing any number (not fixed) of input features.

According to a second embodiment of this disclosure, each of the input features to a CWNN consists of a vector, which is called the "point", and a number, which is called the "value". In some embodiments of the present disclosure, the point may specify an attribute of the signal which is being considered, while the value may specify a relevance of said attribute. As an example, an input feature may be represented by a set [value, point]=$[a_1, (d_{11}, d_{12})]$, with $a_1, d_{11}$, and $d_{12}$ being real numbers.

According to a third embodiment of this disclosure, the CWNN comprises two networks; a main network, which will be further described in later sections, and a second multilayer perceptron called the control network.

Figure 3:
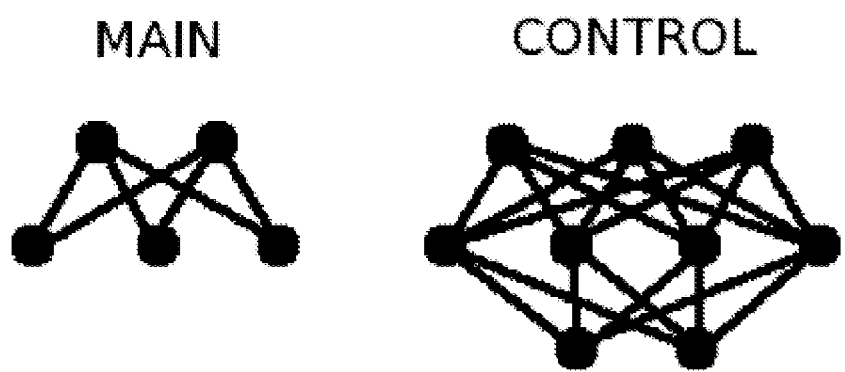
FIG. 3 shows a diagram of a Continuous-Weight Neural Network (CWNN) comprising a main network in its default configuration and a control network, wherein per default, the main network does not have any input nodes.
Figure 4:
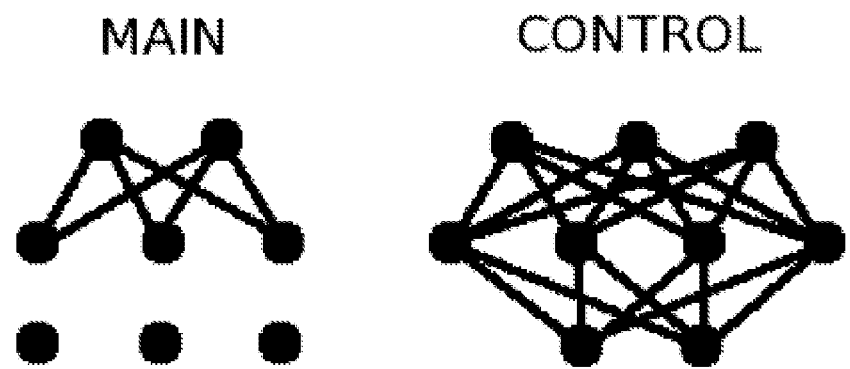
FIG. 4 shows a diagram of the CWNN of FIG. 3 for a case where the number of inputs to the CWNN is three.
Figure 5:
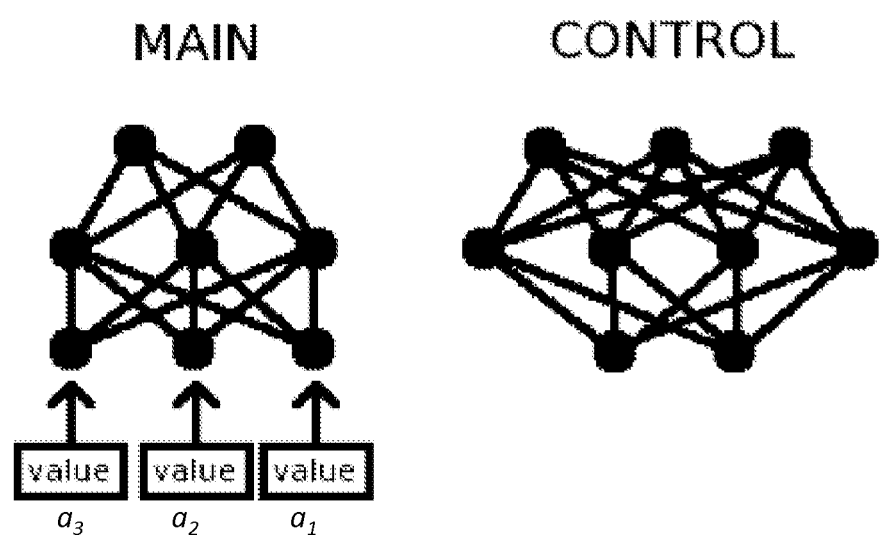
FIG. 5 shows applying of three input values to the input nodes of the CWNN of FIG. 4, wherein all the CWNN connections are made.
Figure 6:
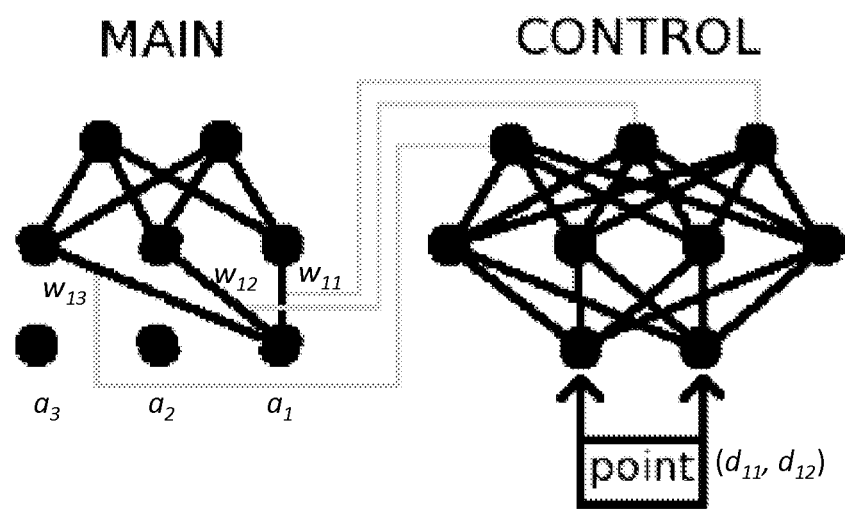
FIG. 6 shows derivation of the weighted connections from an input node to the hidden nodes of the main network of the CWNN of FIG. 5.

According to a fourth embodiment of this disclosure and as depicted by FIG. 3, the main network of the CWNN does not store either the layer of input nodes nor the layer of weighted connections from hidden nodes to input nodes. Instead, and as depicted by FIG. 4, for a given input representation (e.g. a set of input features, each defined by (point, value)), a number of input nodes are constructed equal to the number of input features, wherein three input nodes are added to the main network of FIG. 3. The value of each input feature is fed to the corresponding input node, as depicted by FIG. 5 wherein ($a_1, a_2, a_3$) are the values for each input feature. Then, for each input node, weighted connections are constructed from it to each hidden node. The weights on these connections are computed by feeding the point of that input feature into the control network and reading the outputs from the control network, as depicted by FIG. 6, wherein a two-dimensional point ($d_{11}, d_{12}$) corresponding to the feature with value $a_1$ is fed to the control network, and a corresponding three-dimensional output ($w_{11}, w_{12}, w_{13}$) from the control network is used as weighting values for the branches originating from the node with value $a_1$.

The disclosed architecture thus enables the continuous-weight neural networks to handle a variable number of input features, as the input layer adapts to the number of input features presented. This means, for example, that for one input feature set the input layer may contain five nodes, and for the next input feature set it may contain three nodes, corresponding to an input feature set size of five and three features respectively. Training the algorithm consists of applying gradient descent to both networks (main and control) contained with the CWNN for each training sample.

As discussed in the prior sections, a continuous-weight neural network consists of a two-layer perceptron, called the control network, and a single-layer perceptron, called the main network. The main network has $M_I$ input nodes, and $M_O$ output nodes. The control network has $C_I$ input nodes, $C_H$ hidden nodes, and $C_O=M_I$ output nodes. The continuous-weight neural accepts input representations from the set of functions IRs defined by $\{f: f \in (\mathbb{R}^{C_I} \to \mathbb{R}); f(x)=\Sigma_{i=1}^N a_i \delta(x-d_i)/\delta(0)$ $f$ or $N \in \mathbb{N}, a_i \in \mathbb{R}, d_i \in \mathbb{R}^{C_I}\}$, and maps each representation to a point in $\mathbb{R}^{M_O}$, where $\delta( )$ is the Dirac/impulse function.

To be noted that although a feature set may not be an IR, it may have an equivalent IR representation suited for input to a CWNN; IRs are defined with this concept in mind. In general, if we have a continuously parameterizable dictionary of atom functions and represent a signal as a sparse sum of these atom functions, this sparse representation has an equivalent IR. For a specific example, consider the music instrument classification task. We have a dictionary that contains all functions of the form $y(t)=\sin(2\pi ft)$, where f is a frequency. We model an instrument sound as a sparse sum of these sine waves. Suppose, for the sake of example, that a certain instrument sound is modeled as $g(t)\sim 3*\sin(2\pi(440)t)+2*\sin(2\pi(880)t)$. Then, the corresponding IR is the one-dimensional function (one dimension corresponding to one dictionary parameter: frequency): $f(x)=3\delta(x-440)/\delta(0)+2\delta(x-880)/\delta(0)$.

Figure 11:
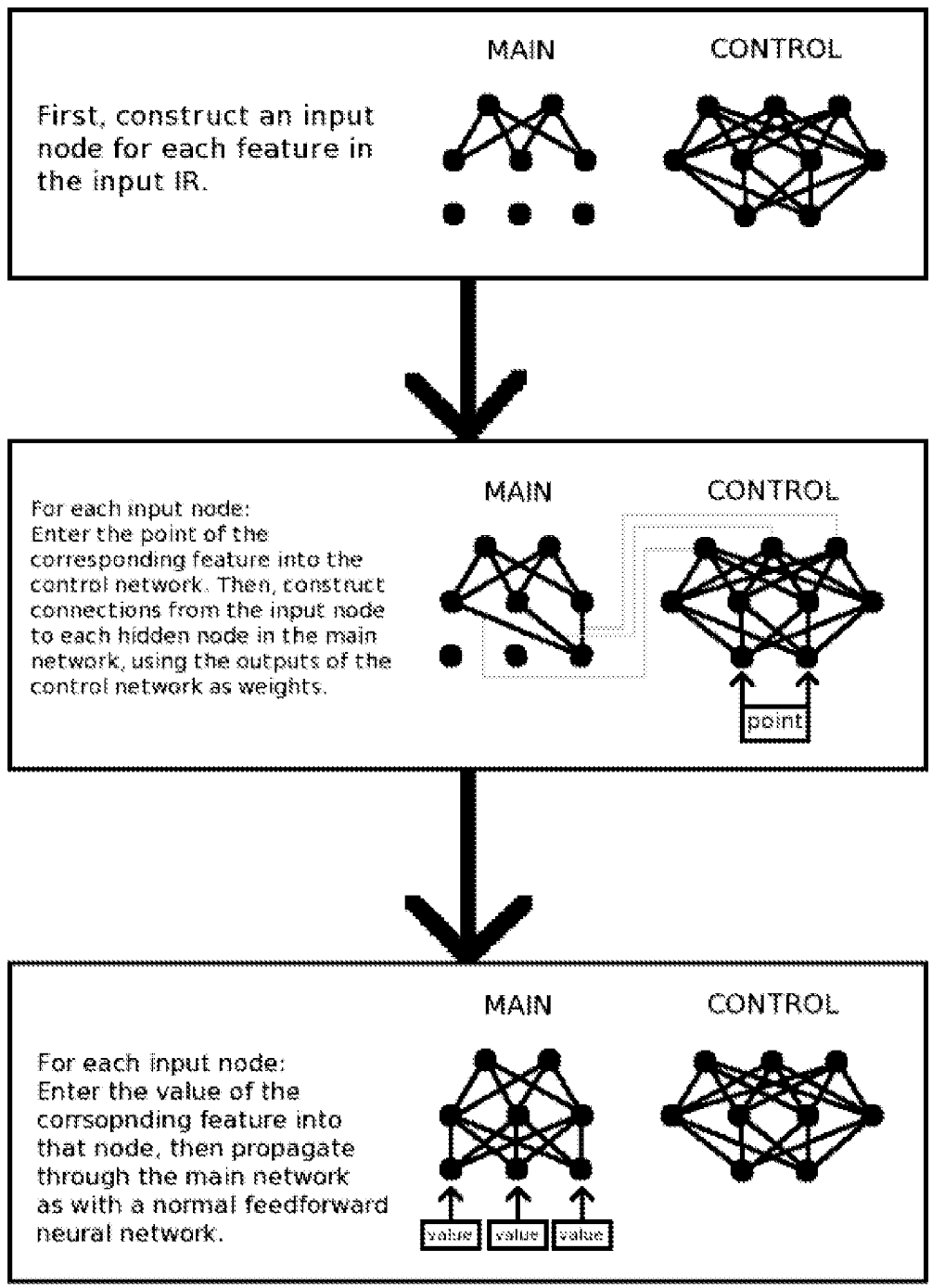
FIG. 11 shows an exemplary flowchart of a classifier according to an embodiment of the present disclosure.

According to one embodiment of the present disclosure, a classifier using a CWNN is presented in FIG. 11. Given the specifications of the control network and the main network of the CWNN, mapping (classifying) of an impulse representation of an input feature to an output real vector, may be carried out as follows (as per FIG. 11):

Let f be an IR composed of N impulses, wherein each impulse of the N impulses is defined by a value $a_i$ and a point $d_i$. In some embodiments the value may be a real number and the point may be a real vector.

Construct a two-layer perceptron called the prime network, consisting of N input nodes, $M_I$ hidden nodes, and $M_O$ output nodes.

Construct the weighted connections between the hidden and output layers of the prime network identically to those in the main network.

For each of the N input nodes in the prime network, let $a_i$ be the input value for the $i^{th}$ input node.

Feed $d_i$ into the control network, and take the corresponding output values of the control network to be the weights associated with the connections between the $i^{th}$ input node and each hidden node in the prime network.

Repeat step above for each of the N input nodes to create the complete layer of weighted connections between the input nodes and the hidden nodes of the prime network.

Finally, propagate the inputs ($a_i$ for all i of N) through the prime network to obtain the $M_O$ output values, which represent the class of the input feature f.

Figure 12:
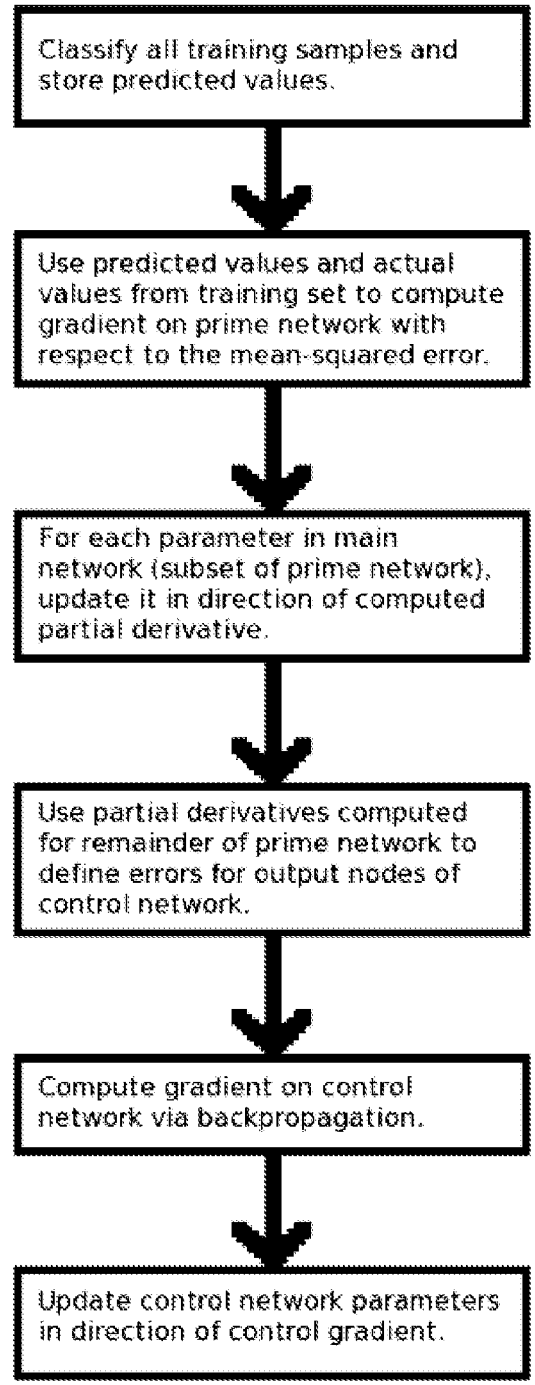
FIG. 12 shows an exemplary flowchart of a training algorithm for the exemplary classifier of FIG. 11.

According to one embodiment of the present disclosure, and as depicted by FIG. 12, a method for training a continuous-weight neural network, given a set of input-output pairs (called training examples) of impulse representations (inputs) and target vectors (outputs), is presented:

(1) For each training example, classify the impulse representation.

(2) Compute the mean-squared error gradient on the prime network using backpropagation.

(3) For each hidden node, output node, or connection between a hidden node and an output node of the prime network, update the corresponding variable in the main network in the direction of the computed gradient of the previous step (2).

(4) For each hidden node in the prime network, define the error for the corresponding output node of the control network to be sum of the gradient components computed for the connections between that hidden node and each input node to the prime network.

(5) Using these errors, compute the mean-squared error gradient on the control network using backpropagation, and update the variables in the control network accordingly.

To be noted that in step (1), all available impulse representations are classified. Once all impulse representations are classified, enough information is available to compute the mean-squared error and mean-squared error gradient.

Also to be noted, every IR in the training set has a known sample value it should ideally be classified as. Thus, classifying an IR in the training set allows to compute the error between the classified value and the known sample value, for consideration in the mean of the squares of these errors.

According to another embodiment, an alternative training method for a CWNN classifier may be based on a genome. In such an embodiment, a genome is constructed from the weights of the main and control networks, and then a genetic algorithm is used to train these weights.

The person skilled in the art of artificial intelligence and signal processing will know how to apply the mentioned techniques and computations, such as backpropagation and mean-squared error gradient, to the disclosed methods above. The skilled person may also find different sequences of applying the above steps, whether serially, in parallel and/or combination thereof, to obtain a similar result, and implement those using various hardware, software, firmware and/or combination thereof.

A useful task in music information retrieval applications is that of classifying musical instruments in a sound segment. In one embodiment of the present disclosure, Continuous-weight neural networks can be applied to solving this problem.

Figure 7:
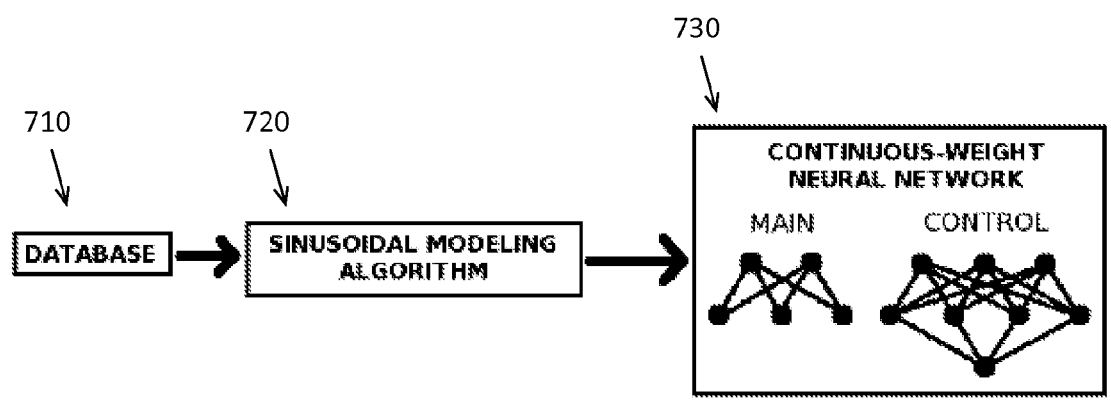
FIG. 7 shows an exemplary embodiment of a CWNN applied to musical instrument classification.
Figure 8:
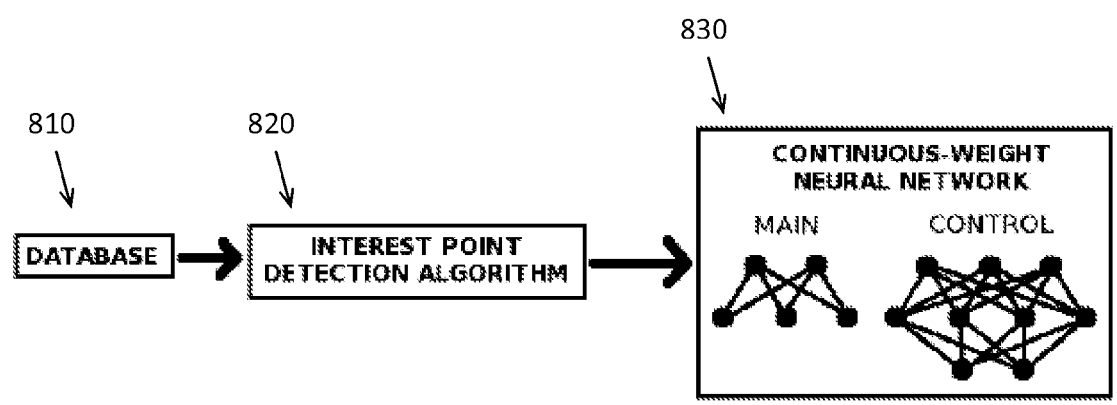
FIG. 8 shows an exemplary embodiment of a CWNN applied to an object classification.

With reference to FIG. 7, a system for musical system classification is presented. In the system of FIG. 8, first, a large database of musical instrument sound files (710), whose waveforms we plan to learn from, is obtained. This database may be stored on any storage medium known to the skilled person (e.g. hard disk, optical disc, magneto-optical disc, tape, cloud, RAID, RAM, ROM, etc.) using any file system known to the skilled person (DOS, FAT, NTFS, HFS, UDF, ISO 9660, etc. . . . ) or even a proprietary file format. Second, features are extracted from these sound files, using the property that musical instrument sounds from tonal sources are acoustic phenomena that can be expressed as a very sparse sum of harmonics, that is, sinusoidal functions of different frequencies. They can thus be represented as IRs since each sinusoidal function can be converted to a point-value representation, wherein the point is a one-dimensional vector consisting of the sinusoid's frequency, and the value is the sinusoid's amplitude. To this end, each of the musical instruments files of the database (710) is fed to a processor (720) wherein a standard sinusoidal modeling algorithm is implemented. Feeding may be implemented using a variety of methods and interfaces known to the skilled person, whether a wired interface (e.g. using copper wires or fiber optic, such as USB, Ethernet, RS-232, ATAPI, SATA, SPDIF, HDMI, proprietary, etc. . . . ), or a wireless interface (e.g. using electromagnetic waves, such as WiFi, Bluetooth, proprietary, etc. . . . ). This processor may be implemented using any target hardware (e.g. FIG. 9) with reasonable computing power and memory, either off the shelf, such as a mainframe, a microcomputer, a desktop (PC, MAC, etc. . . . ), a laptop, a notebook, etc, , , , or a proprietary hardware designed for the specific task and which may include a microprocessor, a digital signal processor (DSP), various FPGA/CPLD, etc. For any given hardware implementation of the processor (720), corresponding software/firmware may be used to generate some features of the sinusoidal modeling algorithm as some features are generated using the target hardware. In the processor (720), each file is decomposed to its harmonics representation, which in turn is converted to point-value representation and stored. The musical instrument file then becomes a set of point-value representations, and thus an IR. Once all the musical instrument files are converted to IRs, this set of IRs may be used as a training set for the continuous-weight neural network (730).

The continuous-weight neural network (730) of FIG. 7 is constructed by constructing a corresponding control network such that it accepts one input (for the sinusoids' frequencies), and constructing a corresponding main network such that it produces an output for each musical instrument being considered (which represents the likelihood that the sample to classify is of that instrument, assuming that the musical instrument being considered has a corresponding IR originating from a sample file from (710)).

The continuous-weight neural network (730) of FIG. 7 may be implemented using a combination of hardware/software/firmware similar to the exemplary embodiments described for processor (720) and other as known by the skilled person.

The CWNN of FIG. 7 may be trained using the training set obtained via (710) and (720) above, resulting in a musical instrument classifier.

It is to be noted that although for the purpose of clarity FIG. 7 shows three separate units, (710), (720), and (730), in practice these may coexist on the same target hardware (e.g. a single processor or a computer) with some reasonable amount of memory. Furthermore, units (720) and (730) may be implemented mainly by software, as these mainly implement signal processing algorithms with intense data manipulation.

Figure 9:
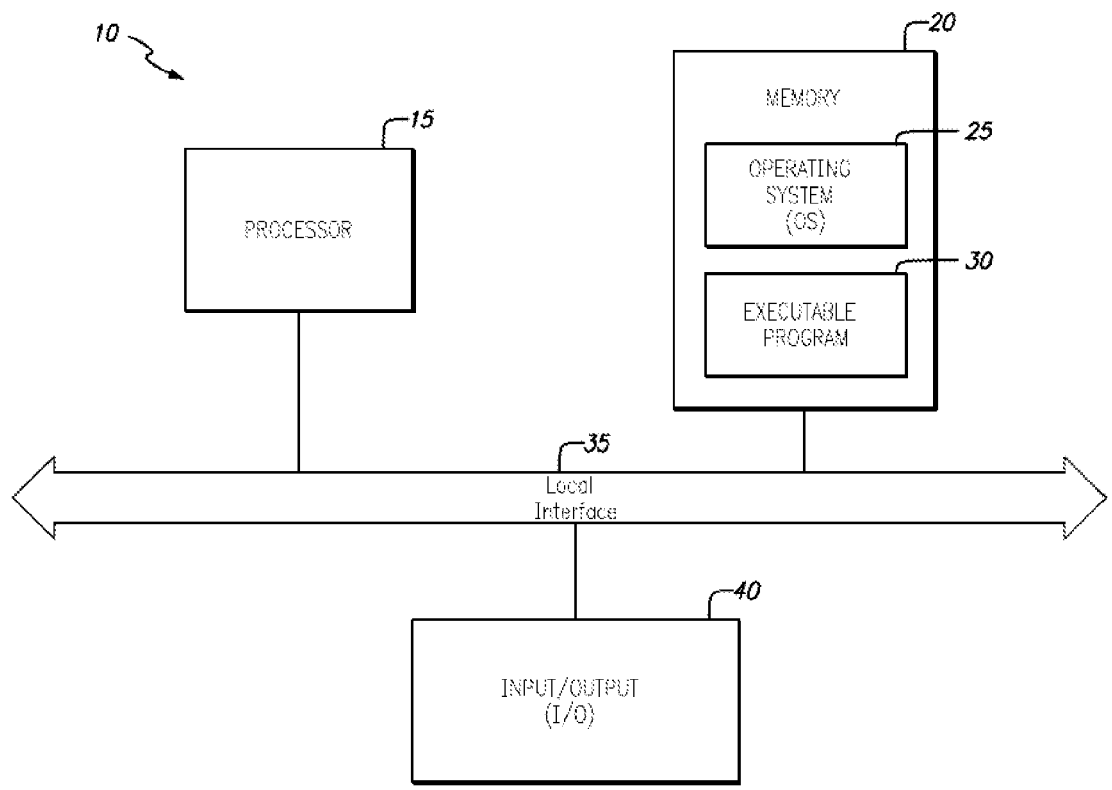
FIG. 9 shows an exemplary embodiment of a target hardware for implementation of a CWNN.

FIG. 9 is an exemplary embodiment of a target hardware (10) (e.g. a computer system) for implementing the embodiment of FIG. 7. This target hardware comprises a processor (15), a memory bank (20), a local interface bus (35) and one or more Input/Output devices (40). The processor may execute one or more instructions related to the implementation of FIG. 7 and as provided by the Operating System (25) based on some executable program stored in the memory (20). These instructions are carried to the processors (20) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, outputting data to a display, or outputting data to a USB flash drive. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 9. In some embodiments a plurality of processors may be used in a parallel configuration for added execution speed. In such a case, the executable program may be specifically tailored to a parallel execution. Also, in some embodiments the processor (15) may execute part of the implementation of FIG. 7, and some other part may be implemented using dedicated hardware/firmware placed at an Input/Output location accessible by the target hardware (10) via local interface (35). The target hardware (10) may include a plurality of executable program (30), wherein each may run independently or in combination with one another.

Figure 10:
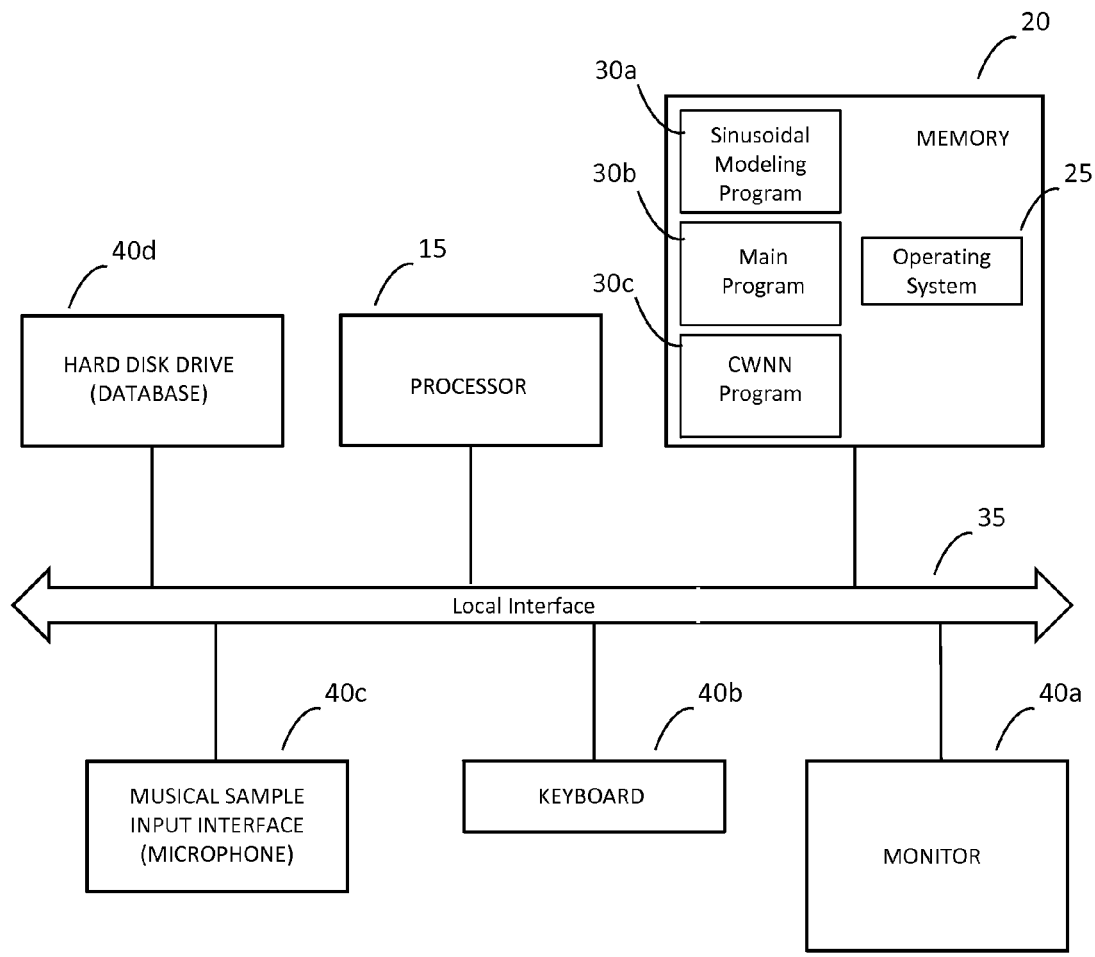
FIG. 10 shows an exemplary system embodiment of the musical instrument classifier of FIG. 7, using the target hardware of FIG. 9.

In one embodiment, and as depicted by FIG. 10, the database (710) may be stored on a hard disk drive (40d) connected to the local interface (35), the sinusoidal modeling algorithm (720) and the CWNN may be implemented in software (30a, 30c) and residing in memory bank (20) as two separate executable programs. A main program (30b), also stored in the memory bank (20), may be used to perform the main tasks of data gathering/storing and user interface and command.

Under user interface/command (e.g. keyboard (40b), display monitor (40a)), the main program (30b) may initiate the task of generating the training samples for the CWNN (30c), using a database location provided by the user and residing on the hard disk drive (40d). In turn the main program (30b) may open the indicated database, read portion of the database, open one file indexed in the database, extract some sequence of the opened file and store in memory (20) (e.g. in a segment, or plurality of non-contiguous segments of the memory), open the sinusoidal modeling executable (30a) and feed the stored data in the memory (20) to it until fully processed by the latter executable. The master program (30b) may routinely check some indicative flags set by the sinusoidal modeling program (30a) in relation to its processing status of the provided data, and accordingly provide supplemental data to it (and/or read data processed by the sinusoidal modeling program), till exhaustion of the stored data sequence of the input file, subsequent to which the main program (30b) may extract another sequence (e.g. contiguous) from the input file. This process may continue till the end of the opened file is reached and then performed again for each file indexed in the database, and finally close the modeling executable program (30a). Although not explicitly described, the skilled person may know that the master program (30b) or the sinusoidal modeling program (30a) may be in charge of storing the processed data, whether to memory (20) as raw data or formatted and stored as a file (e.g. on the same hard disk drive (40d)), and that many variants to the described tasks are available to the skilled person.

Once the task of generating the training samples is completed, the user may initiate the task of training the CWNN using the training samples. These samples may be stored in the same database or in a separate one and as it may be instructed by the user via the user interface as designed in the main program (30b). In this case and similar to the steps executed for generating of the training samples, the master program may open each one of the samples, and feed to an opened CWNN program (30a) which latter uses to update the various variables defining the CWNN network and as described in prior sections and algorithms.

Finally the user may initiate a classifier. As the training task uses the classifier algorithm, in some embodiments both tasks may be implemented within the same executable (30c) and controlled by the main program (30b). In the case where the main program is commanded to perform a classification of a sample, the sample may be input directly (e.g. live) via a microphone (40c) for example. In this case, the master program will use some available resources in the target hardware to first translate the microphone input (40c) to data stored into memory, and then provide these data to an opened CWNN executable (30c) for classifying. In other embodiments the input to the classifier section of the CWNN may already be in the form of stored files and indexed by a database file (or just stored within a folder of the operating system), in which case a batched processing for classifying all the indexed files may be implemented by the master program.

Continuous-weight neural networks can also be applied to the problem of object classification which is now presented as a further embodiment of the present disclosure. With reference to FIG. 8, database (810) contains a large database of image files of objects we want to learn to classify. To this end a number of features are extracted from these image files. In particular, the most descriptive aspects of objects are their interest points, which are locations in the image signifying particularly notable changes in color, brightness and other relevant attributes which the skilled person is familiar with. Sets of interest points can thus be represented as IRs and used in the CWNN. In particular, an interest point can be converted to a point-value representation by letting the point be a two-dimensional vector consisting of the interest point's x- and y-coordinates within a corresponding image file, and letting the value be the interest point's magnitude. To this end, each of the image files of the database (810) is fed to a standard interest point detection algorithm (820) of FIG. 8, which extracts the corresponding interest points, which in turn are converted to point-value representations as described above. The image file then becomes a set of point-value representations, and thus an IR. Once all the image files are converted to IRs, this set of IRs may be used as a training set for the continuous-weight neural network (830).

The continuous-weight neural network of FIG. 8 is constructed by constructing a corresponding control network such that it accepts two inputs (for the interest points' x- and y-coordinates, and constructing a corresponding main network such that it produces a output for each possibly object being considered (which represents the likelihood that the image to classify is of that object). The CWNN of FIG. 8 may be trained using the training set obtained via (810) and (820) above, resulting in an object classifier.

To be noted that units (810), (820) and (830) of FIG. 8 may be implemented using combination of hardware/software/firmware similar to embodiments presented for units (710), (720) and (730) of FIG. 7, using the exemplary target hardware of FIG. 9, and as depicted by FIG. 10.

It should be noted that the example above are merely to demonstrate the flexibility of the CWNN classifier with regard to input features from large data sets. Many audio processing implementations can be constructed with the same paradigm as provided for music instrument classification and object recognition, respectively. For instance, we can perform phoneme recognition and speaker recognition tasks in audio processing by first modeling the sound file with sinusoids, and then training a CWNN on the extracted IRs. The process is identical to with musical instrument classification, except the database to train on is different. Similarly, the object classification disclosed above and as applied to image recognition can be easily expanded to video applications. In this case, any frame within the video sequence can be considered a still image upon which interest point detection and then object recognition may be performed. This in turn allows classification of objects in a video.

The examples set forth above are provided to give those of ordinary skill in the art a complete disclosure and description of how to make and use the embodiments of the Continuous-weight neural networks of the present disclosure, and are not intended to limit the scope of what the inventors regard as their disclosure. Similarly, many image processing implementations can be constructed analogously to the object recognition example. For instance, we can perform facial recognition and gesture recognition tasks in image processing by extracting interest points, and then training a CWNN on the extracted IRs. The process is identical to with object recognition, except the database to train on is different. I am not knowledgeable enough about fingerprints or retina scans to make an informed statement about those domains.

Such embodiments may be, for example, used within digital signal processing fields, such as computer vision and audio processing, where sparse feature representations from over-determined dictionaries are desired. The skilled person may find other suitable implementations of the presented embodiments.

Modifications of the above-described modes for carrying out the disclosure, including pressure control devices, accumulators, and so forth, may be used by persons of skill in the art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A computer-based multi-layer artificial network named continuous-weight neural network (CWNN) configured to receive an input feature set wherein the input feature set comprises a variable number of features wherein each feature of the variable number of features is represented by an input pair comprising an input value and an input point provided to the CWNN, the input value being a real number input value and the input point being a real vector input point, the CWNN further comprising:

a main network and a control network,
wherein the control network is a multilayer perceptron which comprises: i) an input layer comprising CI nodes, and wherein CI equals to a dimension of the real vector input point and ii) an output layer comprising CO nodes, and wherein the main network comprises: i) a hidden layer comprising CO nodes and ii) a plurality of input nodes equal to the variable number of features, wherein the input value of the variable number of features is fed to the input nodes;

CO connections between the CO nodes of the hidden layer and an input node of the main network; and CO weights associated to each of the CO connections, wherein the CO weights are in correspondence of an output of the control network;

wherein the output of the control network is in correspondence of an input point vector associated to an input value fed to the input node of the main network, and a set comprising the CO weights is equal to the output of the control network, the output of the control network being based on the input point fed to an input layer of the control network.

2. The CWNN of claim 1, wherein for a given input feature of integer size N, the main network is a multilayer perceptron with an input layer comprising N input nodes, wherein N varies as a function of the input feature.

3. The CWNN of claim 2, wherein training of the main network and the control network comprises applying a gradient descent algorithm to each network for a given number of training samples.

4. A method for using the CWNN of claim 2, the method comprising: using the CWNN as a classifier.

5. The CWNN of claim 2 wherein the main network and the control network have the same number of layers.

6. The CWNN of claim 5 wherein the main network and the control network have each two layers.

7. The CWNN of claim 2 wherein the main network and the control network have a different number of layers.

8. A computer-based method for implementing a neural-network based classifier, the neural network being a continuous-weight multi-layer artificial neural network (CWNN) comprising a plurality of nodes, the CWNN configured to receive an input feature set, the input feature set comprising a variable number of features, the method comprising:

providing, through a computer, a CWNN comprising a main network and a control network, wherein the main network comprises a hidden layer comprising $M_I$ hidden nodes and an output layer comprising $M_O$ output nodes, and wherein the control network comprises an input layer comprising $C_I$ input nodes, a hidden layer comprising $C_H$ hidden nodes and an output layer comprising $M_I$ output nodes;

providing, through the computer, an input impulse representation (IR) comprising N features, wherein N is a variable and wherein each of the N features comprises a corresponding input value of dimension one and a corresponding input point of dimension $C_I$;

constructing, through the computer, a prime network comprised of N input nodes, $M_I$ hidden nodes and $M_O$ output nodes, the prime network being a two-layer perceptron;

constructing, through the computer, a plurality of weighted connections between the hidden nodes and the output nodes of the prime network identical to a plurality of weighted connections between the hidden nodes and the output nodes of the main network;

selecting, through the computer, a feature of the N features;

based on the selecting, associating, through the computer, an input node of the N input nodes of the prime network to the feature and inputting a corresponding input value to the associated input node;

repeating, through the computer, the selecting, associating and inputting for all N features of the input IR;

based on the repeating, obtaining, through the computer, a one to one mapping of the N features into the N input nodes;

for each of the N input nodes of the prime network, feeding, through the computer, a corresponding input point of the associated feature to the control network and constructing, through the computer, $M_I$ weighted connections from the input node to the $M_I$ hidden nodes of the prime network using $M_I$ output values of the control network as values for the $M_I$ weights;

propagating, through the computer, the N input values of the N input nodes of the input layer of the prime network through the hidden and output layers of the prime network using the constructed weighted connections;

obtaining, through the computer, an output of the prime network in correspondence of the N input values at the output layer of the prime network, and classifying, through the computer, the input IR to the CWNN based on the obtaining of the output.

9. A computer-based method for training a neural network, the neural network being a continuous-weight multi-layer artificial neural network (CWNN) comprising a plurality of nodes, the CWNN configured to receive an input feature set, the input feature set comprising a variable number of features, the method comprising:

providing, through a computer, a set of training impulse representations (IR);

classifying, through the computer, each IR of the set based on the method of claim 8;

based on the classifying, computing, through the computer, a mean-squared error gradient on the prime network using backpropagation;

based on the computing, updating, through the computer, for each hidden node, output node or weighted connection between a hidden node and an output node of the prime network a corresponding variable in the direction of the computed gradient;

for each weighted connection of an input node of the prime network to a hidden node of the prime network, defining, through the computer, a corresponding error gradient to be an error gradient component of an output of the control network;

based on the defining, computing, through the computer, a mean-squared error gradient on the control network using backpropagation, and updating for each hidden node, weighted connection between an output node and a hidden node or weighted connection between a hidden node and an input node of the control network a corresponding variable in the direction of the computed gradient.

10. A computer-based method for implementing a neural-network based classifier, the neural network being a continuous-weight multi-layer artificial neural network (CWNN) comprising a plurality of nodes, the CWNN configured to receive an input feature set, the input feature set comprising a variable number of features, the method comprising:

(1) providing, through a computer, an input feature set f to the CWNN comprising of an impulse representation (IR) of N impulses, N being a variable integer, wherein for each i, i $\in[1_x N]$, an $i^{th}$ impulse of the N impulses is defined by a real number $a_i$, and a real vector $d_i$, of dimension $C_I$;

(2) configuring, through the computer, a main network and a control network of the CWNN;

(3) constructing, through the computer, $M_I$ input nodes, $M_O$ output nodes, and ($M_I \times M_O$) weighted connections between the $M_I$ input nodes and the $M_O$ output nodes of the main network;
(4) constructing, through the computer, $C_I$ input nodes, $C_H$ hidden nodes, $C_O = M_I$ output nodes, ($C_I \times C_H$) weighted connections between the $C_I$ input nodes and the $C_H$ hidden nodes, and ($C_H \times M_I$) weighted connections between the $C_H$ input nodes and the $M_I$ output nodes of the control network;
(5) constructing, through the computer, a prime network comprising of N input nodes, $M_I$ hidden nodes, $M_O$ output nodes, ($N \times M_I$) weighted connections between the N input nodes and the $M_I$ hidden nodes, and ($M_I \times M_O$) weighted connections between the $M_I$ hidden nodes and the $M_O$ output nodes;
(6) setting, through the computer, the ($M_I \times M_O$) weighted connections between the $M_I$ hidden nodes and $M_O$ output nodes of the prime network to be identical to the weighted connections between the $M_I$ input nodes and $M_O$ output nodes of the main network;
(7) implementing, through the computer, step (8);
(8) let i =1 and i $\epsilon$ [1,N];
  a. let the real number $a_i$ be an input value for the $i^{th}$ input node of the prime network;
  b. let the real vector $d_i$ of dimension $C_I$ be an input value to the $C_I$ input nodes of the control network;
  c. propagate the real vector $d_i$ through the control network;
  d. let $w_i = (w_{i1}, w_{i2}, \ldots w_{ij}, \ldots w_{iM_I})$, a real vector of dimension $M_I$, be an output of the control network;
  e. let the values of the $M_I$ weights of the $M_I$ connections between the $i^{th}$ input node of the prime network and the $M_I$ hidden nodes of the prime network be the $M_I$ values $w_{ij}$ of the real vector $w_i$, with i$\epsilon$[1, $M_I$];
  f. let i =i+1; go to step a) if i<N+1, else go to next step;
(9) propagating, through the computer, the N input values of the N input nodes of the prime network through the prime network;
(10) obtaining, through the computer, an output o of the prime network, wherein o =($o_1, o_2, \ldots o_j, \ldots o_{M_o}$), is a real vector of dimension $M_O$;
(11) obtaining, through the computer, a class c of the input feature f provided by the CWNN, wherein c=o.

11. The method of claim 10, wherein the main network is a single-layer perceptron, the control network is a two-layer perceptron, and the prime network is a two-layer perceptron.

* * * * *